United States Patent
Choi et al.

(10) Patent No.: US 12,351,258 B2
(45) Date of Patent: Jul. 8, 2025

(54) CORNER MODULE APPARATUS

(71) Applicant: HYUNDAI MOBIS CO., LTD., Seoul (KR)

(72) Inventors: Won Hyok Choi, Yongin-si (KR); Tae Heon Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/465,432

(22) Filed: Sep. 12, 2023

(65) Prior Publication Data
US 2024/0391525 A1 Nov. 28, 2024

(30) Foreign Application Priority Data
May 24, 2023 (KR) .......................... 10-2023-0067147

(51) Int. Cl.
*B62D 7/06* (2006.01)
*B60G 3/20* (2006.01)
*B62D 5/00* (2006.01)

(52) U.S. Cl.
CPC ................ *B62D 7/06* (2013.01); *B60G 3/20* (2013.01); *B62D 5/006* (2013.01); *B60G 2200/144* (2013.01); *B60G 2200/42* (2013.01); *B60G 2200/44* (2013.01)

(58) Field of Classification Search
CPC . B62D 7/06; B62D 5/006; B60G 3/20; B60G 2200/144; B60G 2200/42; B60G 2200/44
See application file for complete search history.

(56) References Cited

U.S. PATENT DOCUMENTS

| | | | | |
|---|---|---|---|---|
| 6,036,201 A * | 3/2000 | Pond | ...................... | B60G 15/12 280/5.514 |
| 11,472,249 B2 * | 10/2022 | Kuribayashi | ........ | B60G 15/063 |
| 11,865,922 B2 * | 1/2024 | Ameye | .................. | B62D 7/023 |
| 2007/0267793 A1 * | 11/2007 | Chamousset | ........... | F16C 33/80 267/220 |

(Continued)

FOREIGN PATENT DOCUMENTS

CN 113276939 A 8/2021
CN 113460156 A 10/2021

(Continued)

OTHER PUBLICATIONS

Translation of CN-216783616-U (Year: 2022).*

(Continued)

*Primary Examiner* — Paul N Dickson
*Assistant Examiner* — Shams Dhanani
(74) *Attorney, Agent, or Firm* — NSIP Law

(57) ABSTRACT

A corner module apparatus includes a drive unit to provide a driving force to a wheel, a suspension arm to support the drive unit with respect to a vehicle body, a stretchable shock absorber connected at one side thereof to the drive unit, a steering drive member to support another side of the shock absorber with respect to the vehicle body and generate a steering force, and a steering transmission member provided between the steering drive member and the drive unit. The steering transmission member is capable of varying a steering angle of the wheel in conjunction with the steering force generated by the steering drive member.

17 Claims, 18 Drawing Sheets

(56) References Cited

U.S. PATENT DOCUMENTS

| | | | |
|---|---|---|---|
| 2009/0029821 A1* | 1/2009 | Martin, III | F16H 57/037 280/124.156 |
| 2009/0230640 A1* | 9/2009 | Michel | B60G 17/0157 280/6.157 |
| 2009/0230650 A1* | 9/2009 | Mayen | B60G 7/001 280/124.1 |
| 2015/0083508 A1* | 3/2015 | Bluethmann | B62D 5/0418 180/204 |
| 2016/0096550 A1* | 4/2016 | Dames | B62D 7/142 280/86.758 |
| 2021/0086822 A1* | 3/2021 | Furuyoshi | B62D 5/0484 |
| 2022/0041212 A1* | 2/2022 | Moon | B62D 7/20 |
| 2022/0073136 A1* | 3/2022 | Min | B62D 7/14 |
| 2022/0111692 A1* | 4/2022 | Berardi | B60G 3/20 |
| 2023/0219389 A1* | 7/2023 | Lee | B60G 3/26 280/124.128 |

FOREIGN PATENT DOCUMENTS

| | | | | |
|---|---|---|---|---|
| CN | 216783616 U | * | 6/2022 | |
| DE | 3716099 A1 | * | 1/1988 | |
| EP | 4 019 310 A1 | | 6/2022 | |
| EP | 4286247 A1 | * | 12/2023 | B60G 3/00 |
| EP | 4470804 A1 | * | 12/2024 | B60G 11/08 |
| KR | 10-2019-0041855 A | | 4/2019 | |

OTHER PUBLICATIONS

Translation of DE-3716099-A1 (Year: 1988).*
Extended European Search Report Issued on Feb. 13, 2024, in counterpart European Patent Application No. 23192938.1 (8 Pages in English).

* cited by examiner

CORNER MODULE APPARATUS

CROSS-REFERENCE TO RELATED APPLICATION(S)

This application claims the benefit under 35 USC § 119 (a) of Korean Patent Application No. 10-2023-0067147 filed on May 24, 2023, in the Korean Intellectual Property Office, the entire disclosures of which are incorporated herein by reference for all purposes.

BACKGROUND

1. Field

The following disclosure relates to a corner module apparatus, and more particularly, to a corner module apparatus with driving, braking, steering, and suspension systems configured integrally.

2. Description of Related Art

In general, an electric vehicle refers to an eco-friendly vehicle that does not emit exhaust gas at all. The electric vehicle is equipped with a high-voltage battery that supplies energy for traveling, a travel motor that generates a rotational force from the power output from the high-voltage battery, and the like, and transmits the rotational force of the motor to wheels through drive shafts to travel.

Recently, an in-wheel motor vehicle is in the spotlight, in which a motor is installed directly inside a wheel to directly transmit power from the motor to the wheel, in consideration of the advantages of reducing the weight of the vehicle by removing intermediate power transmission devices such as reducers and differential gears and of reducing energy loss in the process of power transmission. Furthermore, development of wheels in which braking, steering, and suspension systems as well as a driving system are configured integrally is actively being carried out.

The related art of the present disclosure is disclosed in Korean Patent Application Publication No. 10-2019-0041855 (published on Apr. 23, 2019, entitled "STEERING SYSTEM FOR IN-WHEEL MOTOR VEHICLE").

SUMMARY

This Summary is provided to introduce a selection of concepts in a simplified format that are further described below in the Detailed Description. This Summary is not intended to identify key features or essential features of the claimed subject matter, nor is it intended to be used as an aid in determining the scope of the claimed subject matter.

Various aspects of the disclosure are directed to a corner module apparatus which is capable of independently controlling movements of individual wheels.

In one general aspect, a corner module apparatus includes a drive unit configured to provide a driving force to a wheel, a suspension arm configured to support the drive unit with respect to a vehicle body, a shock absorber connected at one side thereof to the drive unit and configured to be stretchable, a steering drive member configured to support another side of the shock absorber with respect to the vehicle body and generate a steering force, and a steering transmission member provided between the steering drive member and the drive unit, the steering transmission member configured to vary a steering angle of the wheel in conjunction with the steering force generated by the steering drive member.

The steering drive member may include a steering actuator fixed to the vehicle body and configured to generate a rotational force, a rotating body connected to the steering actuator and rotated about a steering axis by receiving the rotational force from the steering actuator, and a steering joint provided between the rotating body and the shock absorber, the steering joint configured to rotatably support the rotating body with respect to the shock absorber.

The corner module apparatus may further include a plurality of hooks protruding from the steering actuator, spaced along a circumferential surface of the steering actuator, and latched to the vehicle body.

The steering joint may include a steering socket connected to one of the shock absorber and the rotating body, and a steering ball joint connected to the other of the shock absorber and the rotating body and inserted into the steering socket.

The steering transmission member may include a first transmission link rotatably connected to the rotating body, a second transmission link rotatably connected to the drive unit, and a transmission joint provided between the first transmission link and the second transmission link, the transmission joint configured to support the first transmission link and the second transmission link such that the transmission links are relatively rotatable.

The first transmission link may be rotatably connected to the rotating body around a first hinge axis intersecting the steering axis, and the second transmission link may be rotatably connected to the drive unit around a second hinge axis that intersects the steering shaft and is spaced apart from the first hinge axis.

The transmission joint may include a transmission socket connected to one of the first transmission link and the second transmission link, and a transmission ball joint may be connected to the other of the first transmission link and the second transmission link, with the transmission ball joint being inserted into the transmission socket.

The shock absorber may include a cylinder fixed to the drive unit, a piston rod slidably installed in the cylinder and connected to the steering drive member, and a spring connected at both sides thereof to the respective cylinder and piston rod, and elastically deformable in conjunction with a sliding of the piston rod.

The shock absorber may include a pair of shock absorbers, and the pair of shock absorbers may have respective central axes that are spaced apart from each other, with the steering axis interposed therebetween.

The suspension arm may be rotatably connected at both ends thereof to the vehicle body and the drive unit.

In another general aspect, a corner module apparatus includes a drive unit configured to provide a driving force to a wheel, a suspension arm extending from the drive unit, a shock absorber connected at one side thereof to the drive unit and configured to be stretchable, a steering drive member connected to another side of the shock absorber and configured to generate a steering force, a steering transmission member provided between the steering drive member and the drive unit, the steering transmission member configured to vary a steering angle of the wheel in conjunction with the steering force generated by the steering drive member, and a module body detachably coupled to a vehicle body and configured to support the suspension arm and the steering drive member with respect to the vehicle body.

The module body may include a first body detachably coupled to a side surface of the vehicle body and connected to the suspension arm, and a second body extending from the first body and connected to the steering drive member.

The steering drive member may include a steering actuator coupled to the second body and configured to generate a rotational force, a rotating body connected to the steering actuator and rotatable about a steering axis by receiving the rotational force from the steering actuator, and a steering joint provided between the rotating body and the shock absorber, the steering joint configured to rotatably support the rotating body with respect to the shock absorber.

The steering joint may include a steering socket connected to one of the shock absorber and the rotating body, and a steering ball joint connected to the other of the shock absorber and the rotating body, the steering ball being inserted into the steering socket.

The steering transmission member may include a first transmission link rotatably connected to the rotating body, a second transmission link rotatably connected to the drive unit, and a transmission joint provided between the first transmission link and the second transmission link, the transmission joint configured to rotatably support the first transmission link and the second transmission link such that the transmission links are relatively rotatable.

The first transmission link may be rotatably connected to the rotating body around a first hinge axis intersecting the steering axis, and the second transmission link may be rotatably connected to the drive unit around a second hinge axis that intersects the steering shaft and is spaced apart from the first hinge axis.

The transmission joint may include a transmission socket connected to one of the first transmission link and the second transmission link, and a transmission ball joint connected to the other of the first transmission link and the second transmission link and inserted into the transmission socket.

The shock absorber may include a cylinder fixed to the drive unit, a piston rod slidably installed in the cylinder and connected to the steering drive member, and a spring connected at both sides thereof to the respective cylinder and piston rod, and elastically deformable in conjunction with a sliding of the piston rod.

The shock absorber may include a pair of shock absorbers, and the pair of shock absorbers may have respective central axes spaced that are apart from each other, with the steering axis interposed therebetween.

The suspension arm may be rotatably connected at both ends thereof to the first body and the drive unit.

The corner module may further include a processor configured to control movement of at least one of the drive unit, the shock absorber, the steering drive member, or any combination thereof.

DETAILED DESCRIPTION

Figure 1:
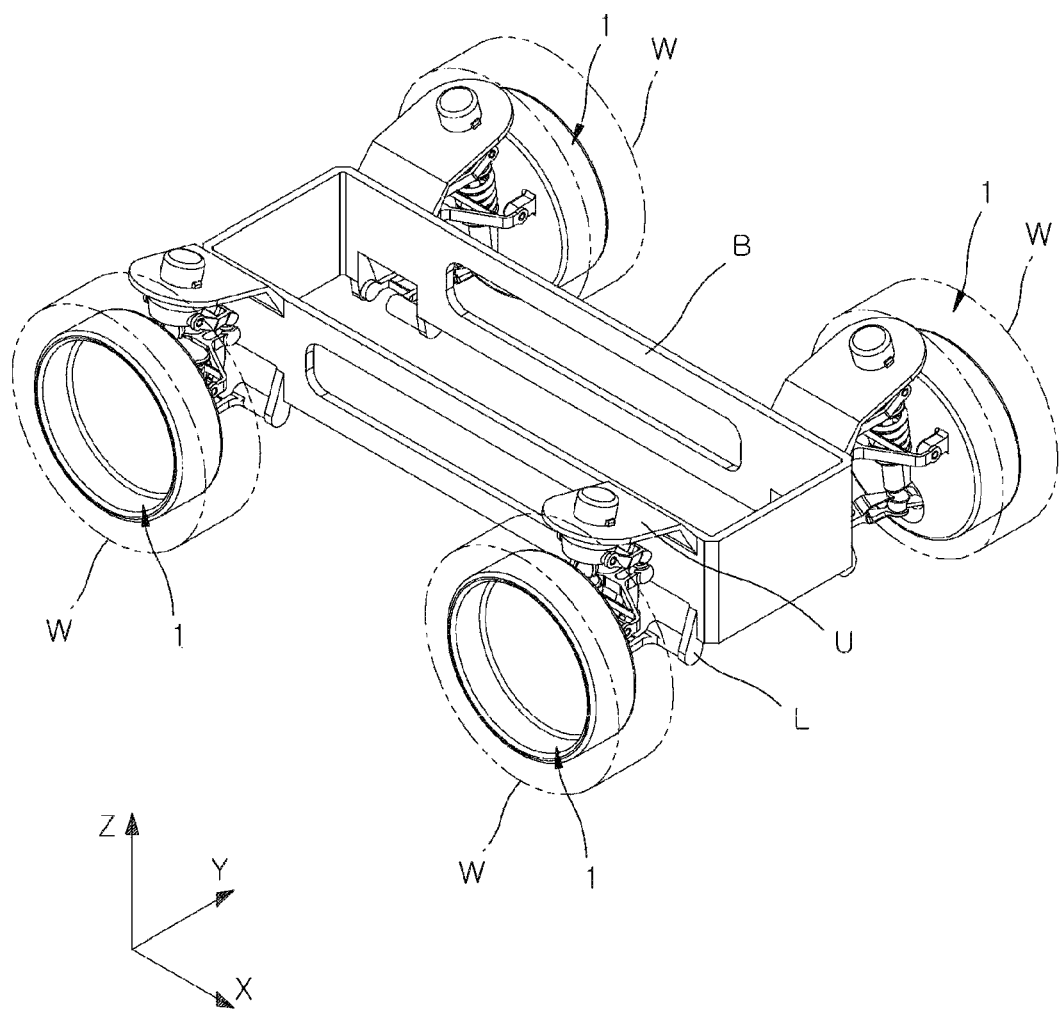
FIG. 1 is a perspective view schematically illustrating an installation state of a corner module apparatus according to a first embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, a corner module apparatus according to exemplary embodiments of the present disclosure will be described with reference to the accompanying drawings.

Figure 2:
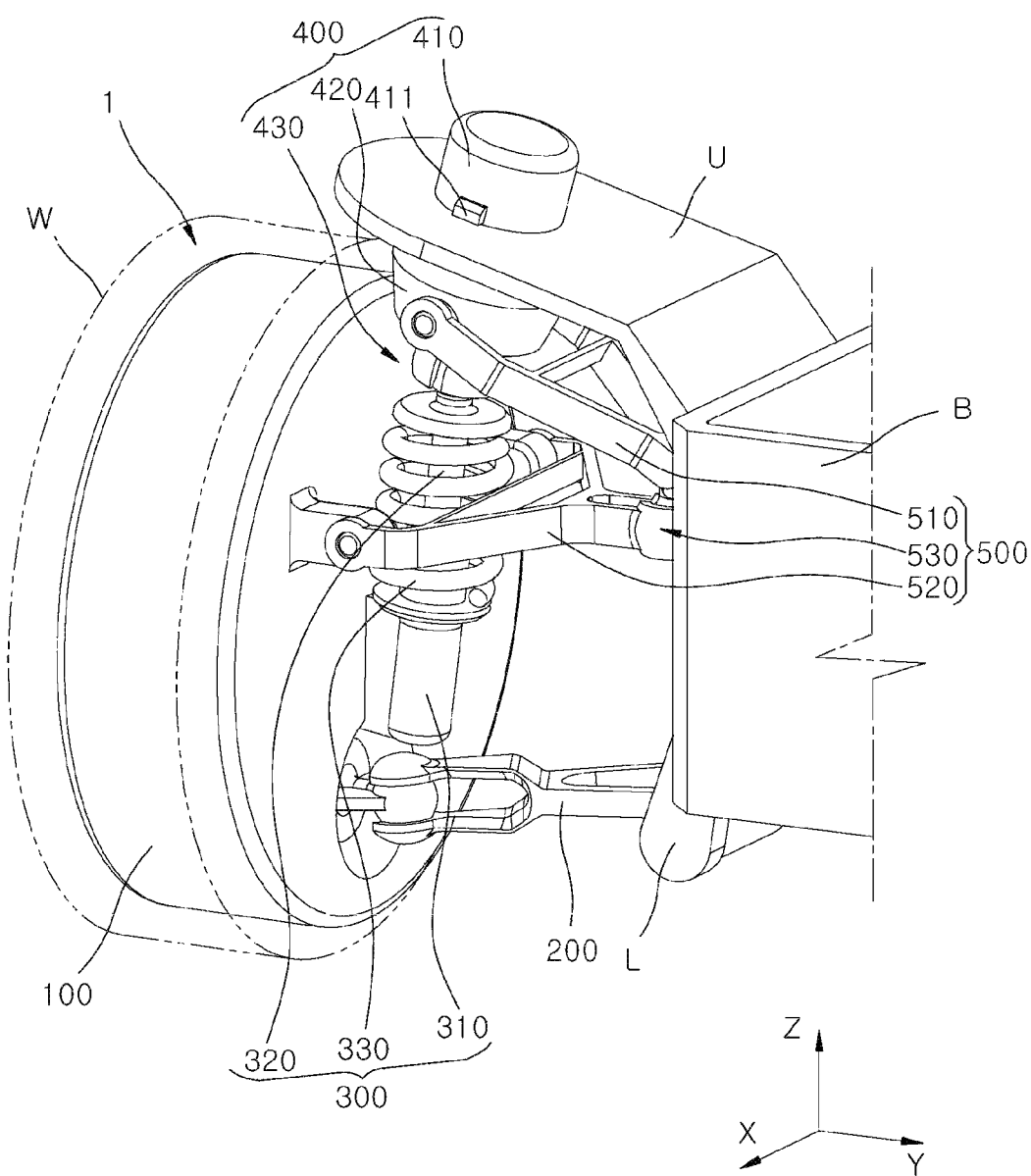
FIG. 2 is an enlarged view schematically illustrating the installation state of the corner module apparatus according to the first embodiment of the present disclosure.

FIG. 1 is a perspective view schematically illustrating an installation state of a corner module apparatus according to a first embodiment of the present disclosure. FIG. 2 is an enlarged view schematically illustrating the installation state of the corner module apparatus according to the first embodiment of the present disclosure.

Referring to FIGS. 1 and 2, the corner module apparatus, which is designated by reference numeral 1, according to the first embodiment is installed between a vehicle body B and a wheel W and generally performs operations such as driving, braking, steering, and suspension. The corner module apparatus 1 may consist of a plurality of corner module apparatuses. The plurality of corner module apparatuses 1 may be connected to individual wheels W, respectively. The plurality of corner module apparatuses 1 may independently perform operations such as driving, braking, steering, and suspension of the wheels W. FIGS. 1 and 2 illustrate four corner module apparatuses 1 as an example, but the present disclosure is not limited thereto. For example, the number of corner module apparatuses may vary depending on the number of wheels or the like by design.

The vehicle body B may be exemplified by various types of structures that form the framework of a vehicle, such as a chassis frame and a subframe. FIGS. 1 and 2 illustrate that the vehicle body B is in the form of a rectangular frame as an example, but the present disclosure is not limited thereto. For example, the vehicle body B may be changed in various forms by design.

The vehicle body B may have an upper bracket U and a lower bracket L formed on the respective top and bottom thereof to support an associated one of the corner module apparatuses 1. The number of upper brackets and lower brackets may correspond to the number of corner module apparatuses.

Figure 3:
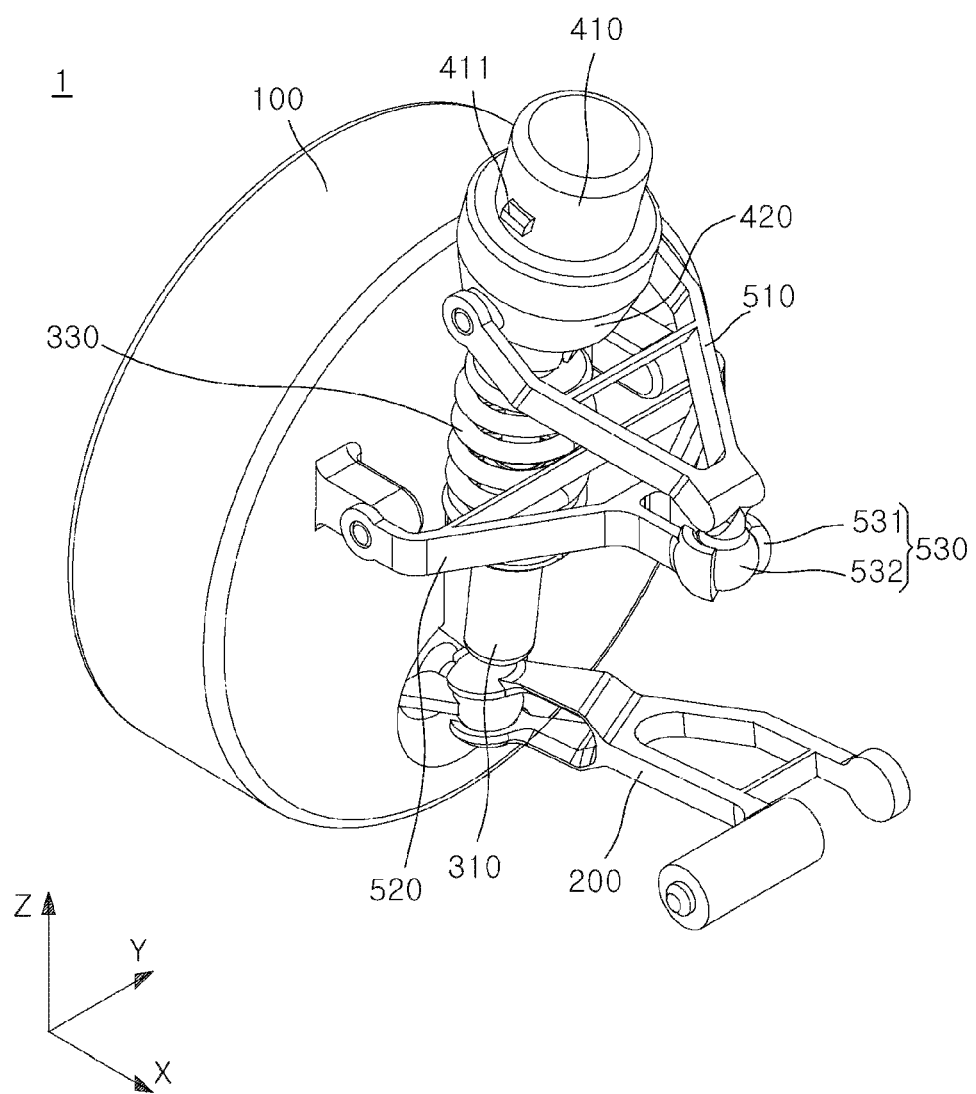
FIG. 3 is a perspective view schematically illustrating a configuration of the corner module apparatus according to the first embodiment of the present disclosure.
Figure 4:
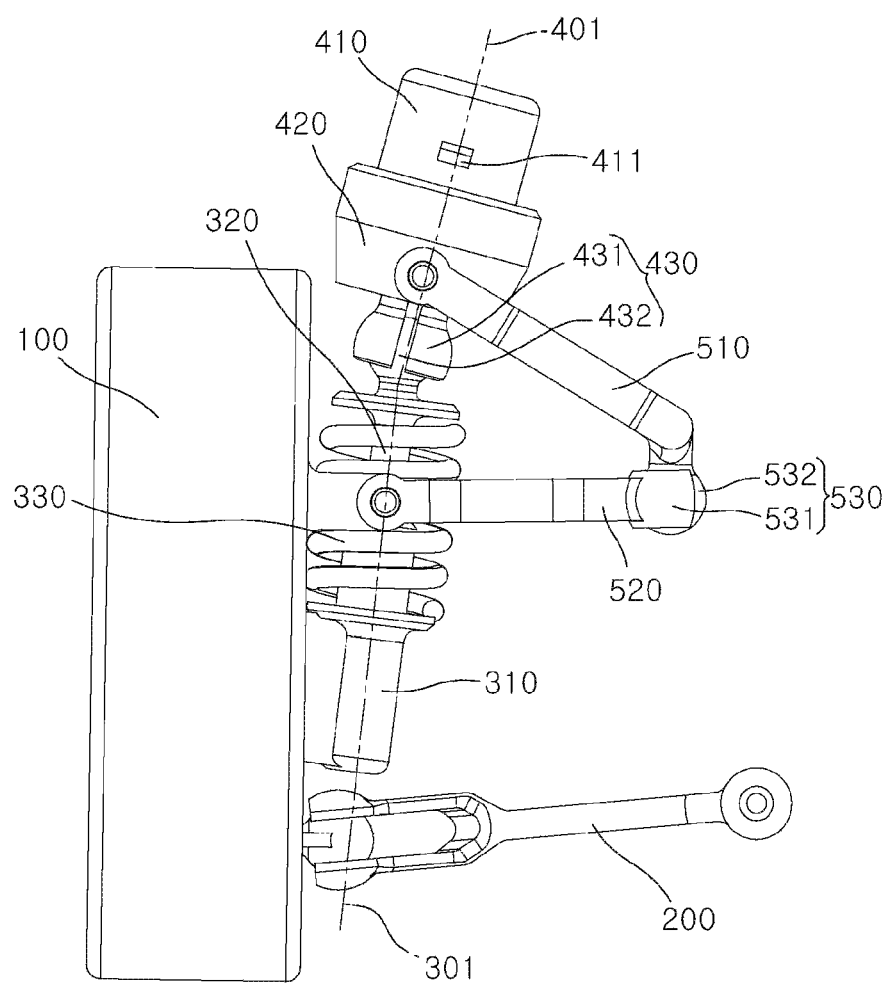
FIG. 4 is a side view schematically illustrating the configuration of the corner module apparatus according to the first embodiment of the present disclosure.
Figure 5:
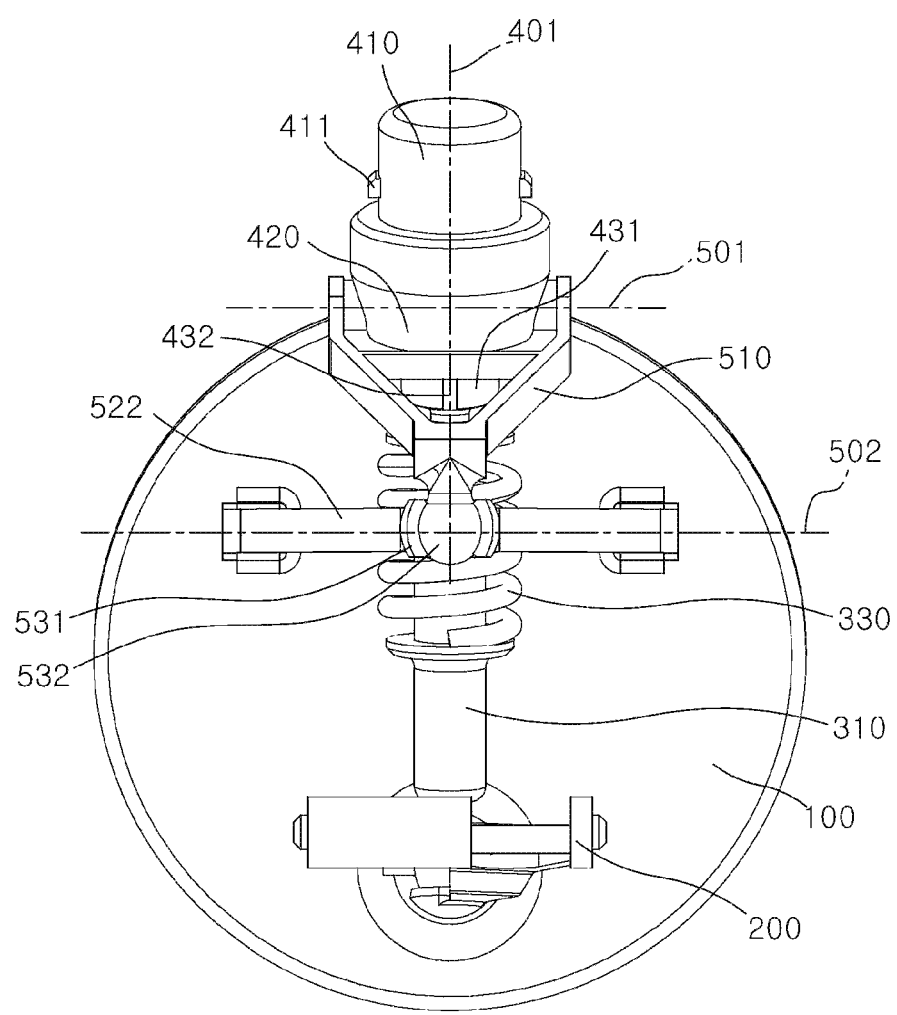
FIG. 5 is a front view schematically illustrating the configuration of the corner module apparatus according to the first embodiment of the present disclosure.
Figure 6:
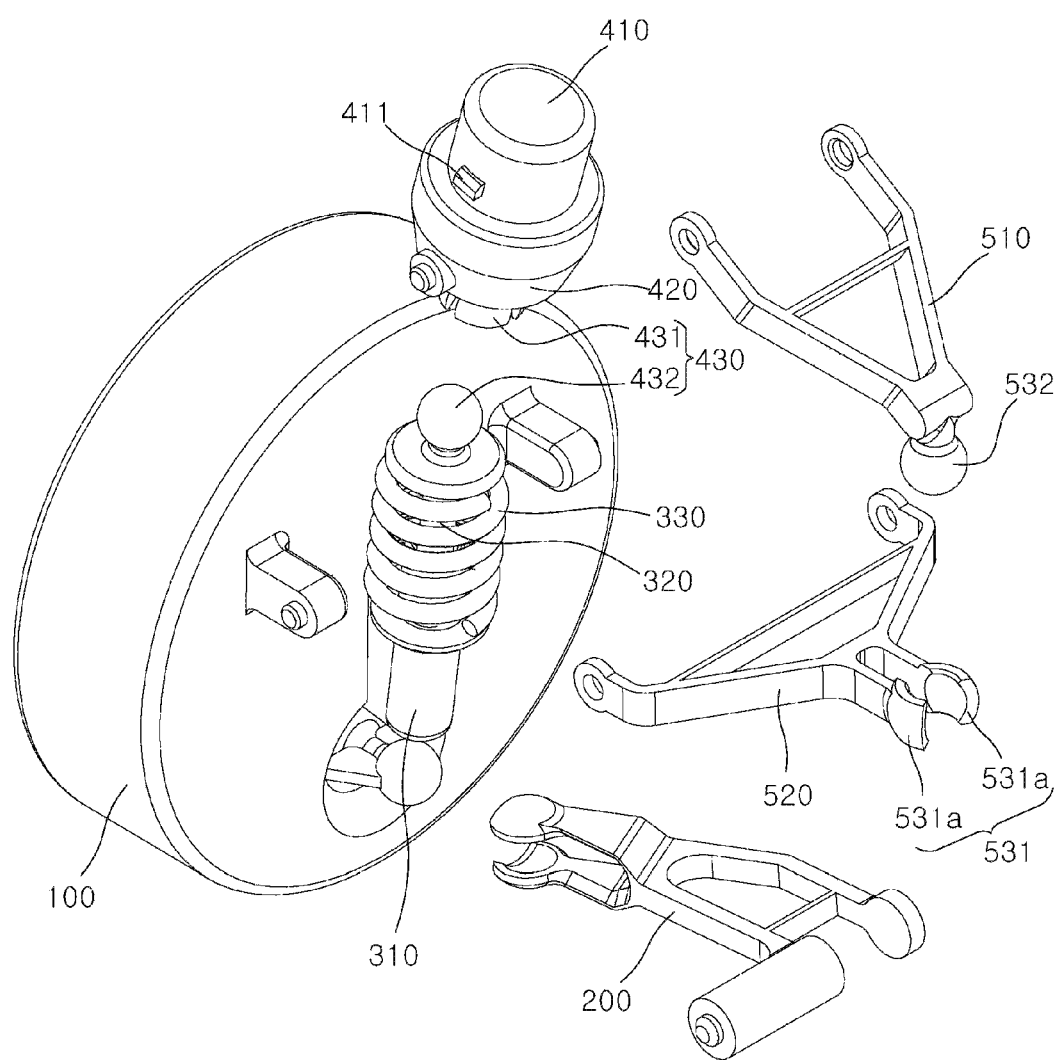
FIG. 6 is an exploded perspective view schematically illustrating the configuration of the corner module apparatus according to the first embodiment of the present disclosure.

FIG. 3 is a perspective view schematically illustrating a configuration of the corner module apparatus according to the first embodiment of the present disclosure. FIG. 4 is a side view schematically illustrating the configuration of the corner module apparatus according to the first embodiment of the present disclosure. FIG. 5 is a front view schematically illustrating the configuration of the corner module apparatus according to the first embodiment of the present disclosure. FIG. 6 is an exploded perspective view schematically illustrating the configuration of the corner module apparatus according to the first embodiment of the present disclosure.

Referring to FIGS. 3 to 6, the corner module apparatus 1 according to this embodiment includes a drive unit 100, a suspension arm 200, a shock absorber 300, a steering drive member 400, and a steering transmission member 500.

The drive unit 100 is connected to the wheel W and provides a driving force to the wheel W. The drive unit 100 according to this embodiment may be exemplified by various types of in-wheel motors, which each are installed inside the wheel W and generate a rotational force for rotating the wheel W by receiving power from the outside. The drive unit 100 may have a diameter smaller than the diameter of the wheel W, and may be disposed inside the wheel W. The drive unit 100 may be disposed such that its central axis is coaxial with the central axis of the wheel W. The drive unit 100 may be connected to the wheel W via a wheel bearing (not shown) or the like.

The drive unit 100 may be equipped therein with an additional braking unit (not shown), which includes a brake disc configured to rotate together with the wheel W and a brake caliper configured to selectively interfere with the rotation of the brake disc and apply or release a braking force to or from the wheel W.

The suspension arm 200 extends from the drive unit 100 and supports the drive unit 100 with respect to the vehicle body B. More specifically, the suspension arm 200 may function as a component, which connects the wheel W to the vehicle body and at the same time absorbs a load applied from the wheel W while the vehicle is traveling by its own rigidity, and controls the movement of the wheel W.

The suspension arm 200 according to this embodiment may extends in the longitudinal direction thereof, which is in the width direction of the vehicle, namely, in the Y-axis direction in FIG. 1, and may have both ends disposed to face the vehicle body B and the drive unit 100, respectively.

The suspension arm 200 may be rotatably connected, at one end thereof, to the vehicle body B, more specifically, to the lower bracket L, via a bush or the like. In this case, the suspension arm 200 may be rotatably connected, at one end thereof, to the lower bracket L in the longitudinal direction of the vehicle, namely, in a direction parallel to the X-axis FIG. 1. Accordingly, the suspension arm 200 may rotate relative to the vehicle body B during bump and rebound movements of the wheel W and perform a suspension behavior.

The suspension arm 200 may be rotatably connected, at the other end thereof, to one surface of the drive unit 100 facing the vehicle body B. In this case, the suspension arm 200 may be rotatably connected, at the other end thereof, to one surface of the drive unit 100 in a multi-axis manner by a ball joint or the like. Accordingly, the suspension arm 200 may guide the bump and rebound movements of the wheel W while inducing a natural steering movement of the wheel W.

FIGS. 3 to 6 illustrate that a single suspension arm 200 is formed as an example, but the present disclosure is not limited thereto. For example, a plurality of suspension arms may be formed. In this case, the plurality of suspension arms 200 may be spaced apart from each other in the height direction of the vehicle body B, namely, in a direction parallel to the Z-axis in FIG. 1.

The shock absorber 300 is connected, at one side thereof, to the drive unit 100 and is stretchable longitudinally. The other side of the shock absorber 300 may be connected to the steering drive member 400. The shock absorber 300 may function as a component that absorbs shock or vibration transmitted from the wheel W when the vehicle travels or when the wheel W bumps or rebounds. The shock absorber 300 may have both longitudinal sides spaced vertically. In this case, the shock absorber 300 may be disposed such that its central axis 301 is inclined at a predetermined angle with respect to the direction perpendicular to the ground, namely, the Z-axis direction in FIG. 1.

The shock absorber 300 according to this embodiment may include a cylinder 310, a piston rod 320, and a spring 330.

The cylinder 310 defines an external appearance of one side of the shock absorber 300 and is fixed to the drive unit 100. The cylinder 310 according to this embodiment may have a hollow cylindrical shape with an open upper end. The cylinder 310 may be filled therein with a fluid such as oil capable of performing a damping function. The cylinder 310 may have an outer surface fixed to one surface of the drive unit 100 facing the vehicle body B. In this case, the cylinder 310 may be integrally fixed to one surface of the drive unit 100 by welding or the like, or may be detachably fixed to one surface of the drive unit 100 by bolting or the like.

The piston rod 320 defines an external appearance of the other side of the shock absorber 300 and is slidably installed in the cylinder 310. The piston rod 320 according to this embodiment may be in the form of a substantially rod, and may have a lower end inserted into the cylinder 310 through the upper end of the cylinder 310. The upper end of the piston rod 320 may be connected to the steering drive member 400. As the steering drive member 400 is fixed at a certain position, the piston rod 320 may reciprocate in the longitudinal direction of the cylinder 310, namely, in a direction parallel to the central axis 301 of the shock absorber 300 when the wheel W moves up and down.

Both sides of the spring 330 are connected to the cylinder 310 and the piston rod 320, respectively, and the spring 330 is elastically deformed in conjunction with the sliding of the piston rod 320. That is, the spring 330 may function as a component that absorbs shock by applying an elastic restoring force in a direction opposite to the sliding of the piston rod 320. The spring 330 according to this embodiment may be in the form of a coil spring. The spring 330 may be disposed such that its inner surface surrounds the outer surfaces of the cylinder 310 and the piston rod 320. The spring 330 may have lower and upper ends fixed to the cylinder 310 and the piston rod 320, respectively. In this case, the lower and upper ends of the spring 330 may be directly fixed to the cylinder 310 and the piston rod 320, respectively, or alternatively may be fixed to the cylinder 310 and the piston rod 320 via a separate pad or the like.

The steering drive member 400 is fixed to the vehicle body B, and generates a steering force for a steering movement of the wheel W. The steering drive member 400 may be connected to the other side of the shock absorber 300 and may support the other side of the shock absorber 300 with respect to the vehicle body B at a fixed position.

Figure 7:
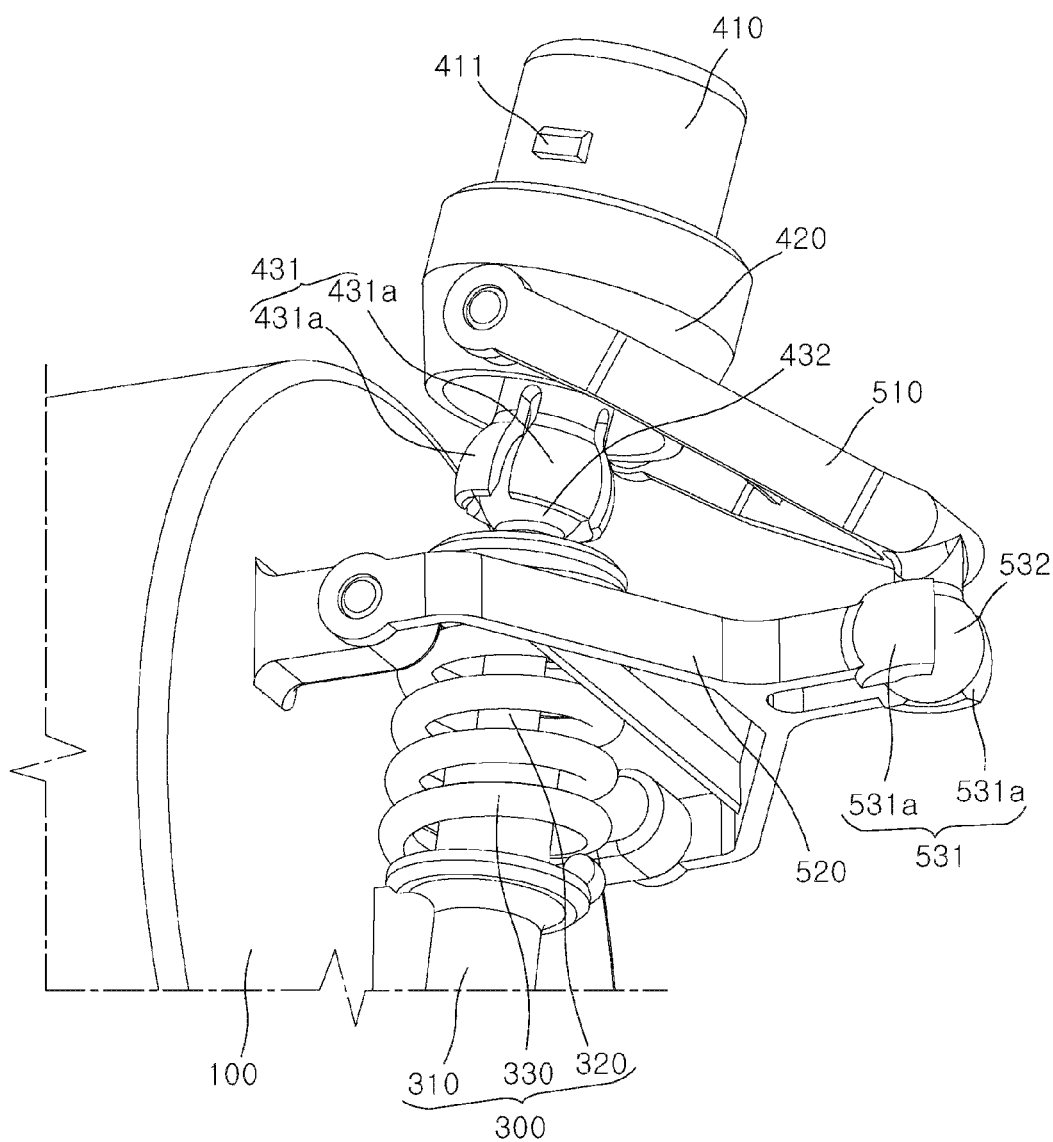
FIG. 7 is an enlarged view schematically illustrating a configuration of a steering drive member and a steering transmission member according to the first embodiment of present disclosure.

FIG. 7 is an enlarged view schematically illustrating a configuration of the steering drive member and the steering transmission member according to the first embodiment of present disclosure.

Referring to FIGS. 3 to 7, the steering drive member 400 according to this embodiment may include a steering actuator 410, a rotating body 420, and a steering joint 430.

The steering actuator 410 is fixed to the vehicle body B and generates a rotational force. The steering actuator 410 according to this embodiment may include an electric motor that generate a rotational force by receiving power from the outside, and a reducer connected to the electric motor to amplify the rotational force generated by the electric motor. The steering actuator 410 may be spaced apart from the drive unit 100. In this case, the steering actuator 410 may be disposed to face one surface of the drive unit 100 to which the shock absorber 300 is connected. Accordingly, the steering actuator 410 can reduce the overall height of the corner module apparatus 1 compared to the case where the steering actuator 410 faces the upper surface of the drive unit 100, and can prevent interference with the wheel W when the wheel W moves up and down.

The steering actuator 410 may be fixed to the vehicle body B, more specifically, to the upper bracket U. For example, the steering actuator 410 may have a hook 411 protruding in the radial direction of the steering actuator 410 from the outer surface of the steering actuator 410. The hook 411 may consist of a plurality of hooks spaced apart from each other along the circumferential surface of the steering actuator 410. The steering actuator 410 may be inserted so as to pass through the upper bracket U vertically. The steering actuator 410 may be fixed to the vehicle body B as the hook 411 is latched to the upper surface of the upper bracket U. However, the present disclosure is not limited thereto. For example, the steering actuator 410 may be fixed to the upper bracket U by welding, bolting, or the like.

The rotating body 420 is connected to the steering actuator 410 and rotates about a steering axis 401 by receiving the rotational force from the steering actuator 410. The steering axis 401 may function as a central axis of the rotational force transmitted from the steering actuator 410 to the steering transmission member 500. The steering axis 401 may be inclined at a predetermined angle with respect to a direction perpendicular to the ground, namely, a direction parallel to the Z-axis. As illustrated in FIG. 3, the steering axis 401 may be disposed to intersect the central axis 301 of the shock absorber 300 at any one point, or alternatively the steering axis 401 may be disposed on the same straight line as the central axis 301 of the shock absorber 300.

The rotating body 420 according to this embodiment may have a substantially cylindrical shape, and may be disposed such that its upper end faces the lower end of the steering actuator 410. In this case, the rotating body 420 may be disposed such that its central axis is positioned coaxially with the steering axis 401. The rotating body 420 may be rotatably supported, at the upper end thereof, on the lower end of the steering actuator 410. The rotating body 420 may be connected to the reducer of the steering actuator 410 and may receive the rotational force generated by the steering motor through the reducer. Accordingly, the rotating body 420 may be rotated clockwise or counterclockwise about the steering axis 401 when the steering actuator 410 is operated.

The steering joint 430 is provided between the rotating body 420 and the shock absorber 300 and rotatably supports the rotating body 420 with respect to the shock absorber 300. That is, the steering joint 430 may function as a component, which interconnects the shock absorber 300 and the steering drive member 400 and at the same time absorbs the torsional force generated between the shock absorber 300 and the steering drive member 400 during the suspension behavior and steering movement of the wheel W.

The steering joint 430 according to this embodiment may include a steering socket 431 and a steering ball joint 432.

Hereinafter, an example will be described in which the steering socket 431 is connected to the rotating body 420 and the steering ball joint 432 is connected to the shock absorber 300. However, the present disclosure is not limited thereto. For example, the steering socket 431 may be connected to the shock absorber 300 and the steering ball joint 432 may be connected to the rotating body 420.

The steering socket 431 may extend downward from the lower end of the rotating body 420. The steering socket 431 may be elastically deformable. For example, the steering socket 431 may include a plurality of steering socket blades 431a spaced apart from each other along one circumference centered on the steering axis 401. The plurality of steering socket blades 431a may each be made of an elastically deformable material such as plastic. Accordingly, the plurality of steering socket blades 431a may be gathered or spread out around the steering axis 401 while the steering ball joint 432 is inserted into or removed from the steering socket 431.

The steering ball joint 432 may be connected to the shock absorber 300, more specifically, to the upper end of the piston rod 320. The steering ball joint 432 may be in the form of a substantially sphere and may be inserted into the steering socket 431. As the steering ball joint 432 has a spherical shape, the steering ball joint 432 may be rotatably supported around a number of axes inside the steering socket 431. Accordingly, the steering ball joint 432 allows the angle of the central axis 301 of the shock absorber 300 with respect to the steering axis 401 to change in all directions, thereby inducing a more smooth suspension behavior and steering movement of the wheel W.

The static friction force between the steering socket 431 and the steering ball joint 432 may be set smaller than the magnitude of the rotational force transmitted from the steering actuator 410 to the rotating body 420. Accordingly, the steering socket 431 and the steering ball joint 432 may rotate relative to each other during the steering movement of the wheel W, thereby inducing the steering force generated by the steering actuator 410 to be smoothly transmitted to the steering transmission member 500.

The steering transmission member 500 is provided between the steering drive member 400 and the drive unit 100, and varies the steering angle of the wheel W in conjunction with the steering force generated by the steering drive member 400. That is, the steering transmission member 500 may function as a component that transmits the rotational force generated by the steering drive member 400 to the wheel W.

The steering transmission member 500 according to this embodiment may include a first transmission link 510, a second transmission link 520, and a transmission joint 530.

The first transmission link 510 defines an external appearance of one side of the steering transmission member 500, and is rotatably connected to the rotating body 420. The first transmission link 510 according to this embodiment may be in the form of various types of link arms. The first transmission link 510 may be rotatably connected, at one end thereof, to the outer surface of the rotating body 420 via a bush, a bearing, or the like. The first transmission link 510 may be rotated about the steering axis 401 along with the rotation of the rotating body 420.

The first transmission link 510 may be rotatably connected, at one end thereof, to the rotating body 420 around a first hinge axis 501 that intersects the steering axis 401. Accordingly, the first transmission link 510 may be rotated about the first hinge axis 501 with respect to the rotating body 420 during the bump and rebound movements of the wheel W, and may perform a suspension behavior together with the suspension arm 200.

The second transmission link 520 defines an external appearance of the other side of the steering transmission member 500, and is rotatably connected to the drive unit 100. The second transmission link 520 according to this embodiment may be in the form of various types of link arms. The second transmission link 520 may be rotatably connected, at one end thereof, to one surface of the drive unit 100 facing the vehicle body B via a bush, a bearing, or the like. The second transmission link 520 may receive the rotational force of the first transmission link 510 through the transmission joint 530 when the wheel W is steered, may rotate together with the first transmission link 510, and may vary the steering angle of the wheel W.

One end of the second transmission link 520 may intersect the steering axis 401. The second transmission link 520 may be rotatably connected, at one end thereof, to the drive unit 100 around a second hinge axis 502 vertically spaced apart from the first hinge axis 501. The second hinge axis 502 may be parallel to the first hinge axis 501, or alternatively may be inclined with respect to the first hinge axis 501. Accordingly, the second transmission link 520 may be rotated about the second hinge axis 502 with respect to the rotating body 420 during the bump and rebound movements of the wheel W, and may perform a suspension behavior together with the suspension arm 200.

The transmission joint 530 is provided between the first transmission link 510 and the second transmission link 520, and supports the first and second transmission links 510 and 520 to be relatively rotatable. That is, the transmission joint 530 may function as a component, which transmits to the second transmission link 520 the rotational force input from the rotating body 420 to the first transmission link 510 and at the same time absorbs the torsional force generated between the first transmission link 510 and the second transmission link 520 during the suspension behavior and steering movement of the wheel W.

The transmission joint 530 according to this embodiment may include a transmission socket 531 and a transmission ball joint 532.

Hereinafter, an example will be described in which the transmission socket 531 is connected to the second transmission link 520 and the transmission ball joint 532 is connected to the first transmission link 510. However, the present disclosure is not limited thereto. For example, the transmission socket 531 may be connected to the first transmission link 510 and the transmission ball joint 532 may be connected to the second transmission link 520.

The transmission socket 531 may extend from the other end of the second transmission link 520. The transmission socket 531 may be elastically deformable. For example, the transmission socket 531 may include a plurality of transmission socket blades 531a spaced apart from each other along one circumference centered on the other end of the second transmission link 520. The plurality of transmission socket blades 531a may each be made of an elastically deformable material such as plastic. Accordingly, the plurality of transmission socket blades 531a may be gathered or spread out while the transmission ball joint 532 is inserted into or removed from the transmission socket 531.

The transmission ball joint 532 may extend from the other end of the first transmission link 510. The transmission ball joint 532 may be in the form of a substantially sphere and may be inserted into the transmission socket 531. As the transmission ball joint 532 has a spherical shape, the transmission ball joint 532 may be rotatably supported around a number of axes inside the transmission socket 531. Accordingly, the transmission ball joint 532 allows the angle of the second transmission link 520 with respect to the first transmission link 510 to change in all directions, thereby inducing a more smooth suspension behavior and steering movement of the wheel W.

The kinetic friction force between the transmission socket 531 and the transmission ball joint 532 may be set greater than the magnitude of the rotational force transmitted from the rotating body 420 to the first transmission link 510. Accordingly, the transmission socket 531 and the transmission ball joint 532 limit the relative rotation between the first transmission link 510 and the second transmission link 520 during normal steering operation so as to smoothly transmit the steering force to the wheel W. On the other hand, the transmission socket 531 and the transmission ball joint 532 allow the relative rotation between the first transmission link 510 and the second transmission link 520 at a certain angle only when an excessive torsional load is applied between the first transmission link 510 and the second transmission link 520, thereby preventing damage to parts.

Hereinafter, the operation of the corner module apparatus 1 according to the first embodiment of the present disclosure will be described.

Figure 8:
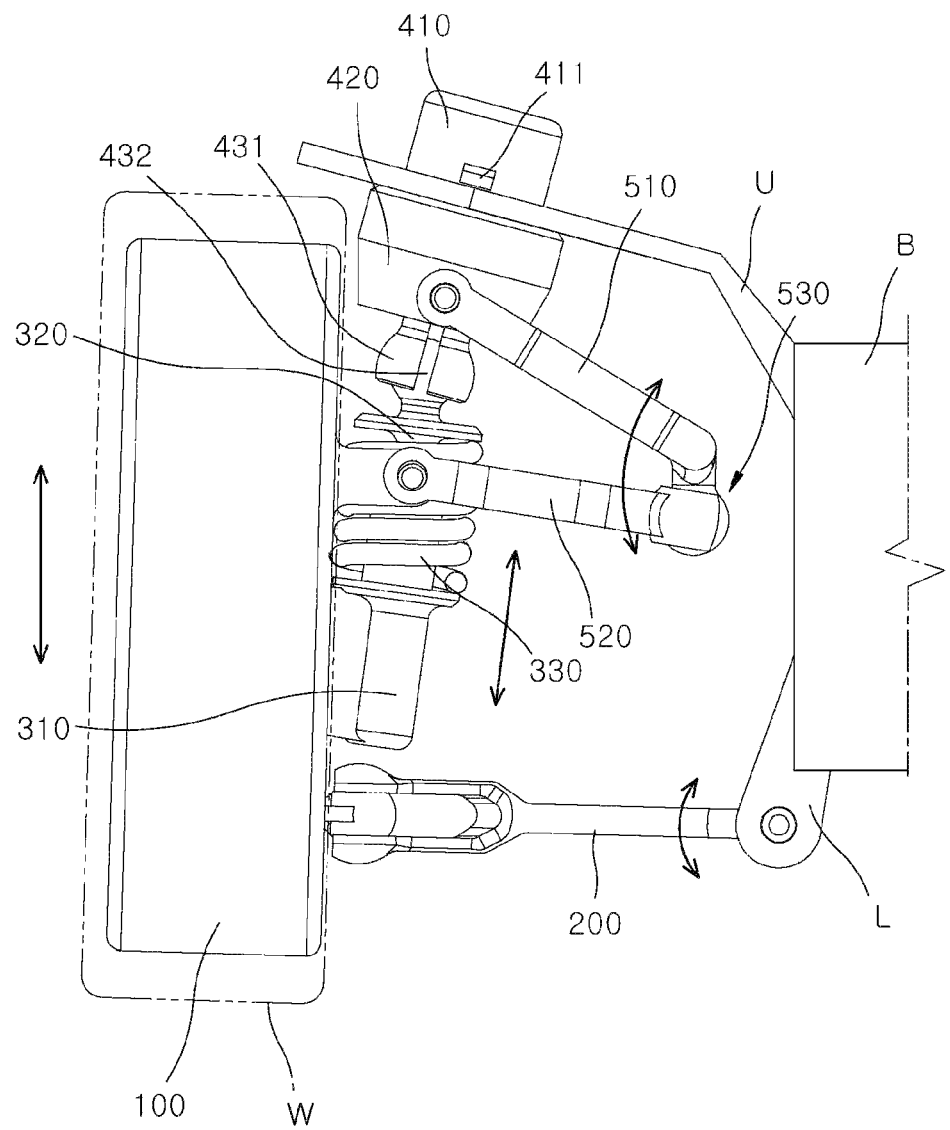
FIG. 8 is a view schematically illustrating a suspension operation of the corner module apparatus according to the first embodiment of the present disclosure.

FIG. 8 is a view schematically illustrating a suspension operation of the corner module apparatus according to the first embodiment of the present disclosure.

Referring to FIG. 8, when the wheel W passes through irregularities on the road surface while the vehicle is traveling, the wheel W moves up and down and performs a bump or rebound movement.

As the wheel W moves up and down, the suspension arm 200 adjusts the installation angles of the drive unit 100 and the vehicle body B at both ends thereof and guides the movement of the wheel W.

As the steering drive member 400 is fixed at the set position, the shock absorber 300 is compressed or extended longitudinally and applies a buffering force in a direction opposite to the movement direction of the wheel W.

As the length of the shock absorber 300 varies, the first transmission link 510 and the second transmission link 520 connected, at the respective ends thereof, to the rotating body 420 and the drive unit 100 have variable relative angle by the relative rotation between the transmission socket 531 and the transmission ball joint 532, and guide the movement of the wheel W together with the suspension arm 200.

Figure 9:
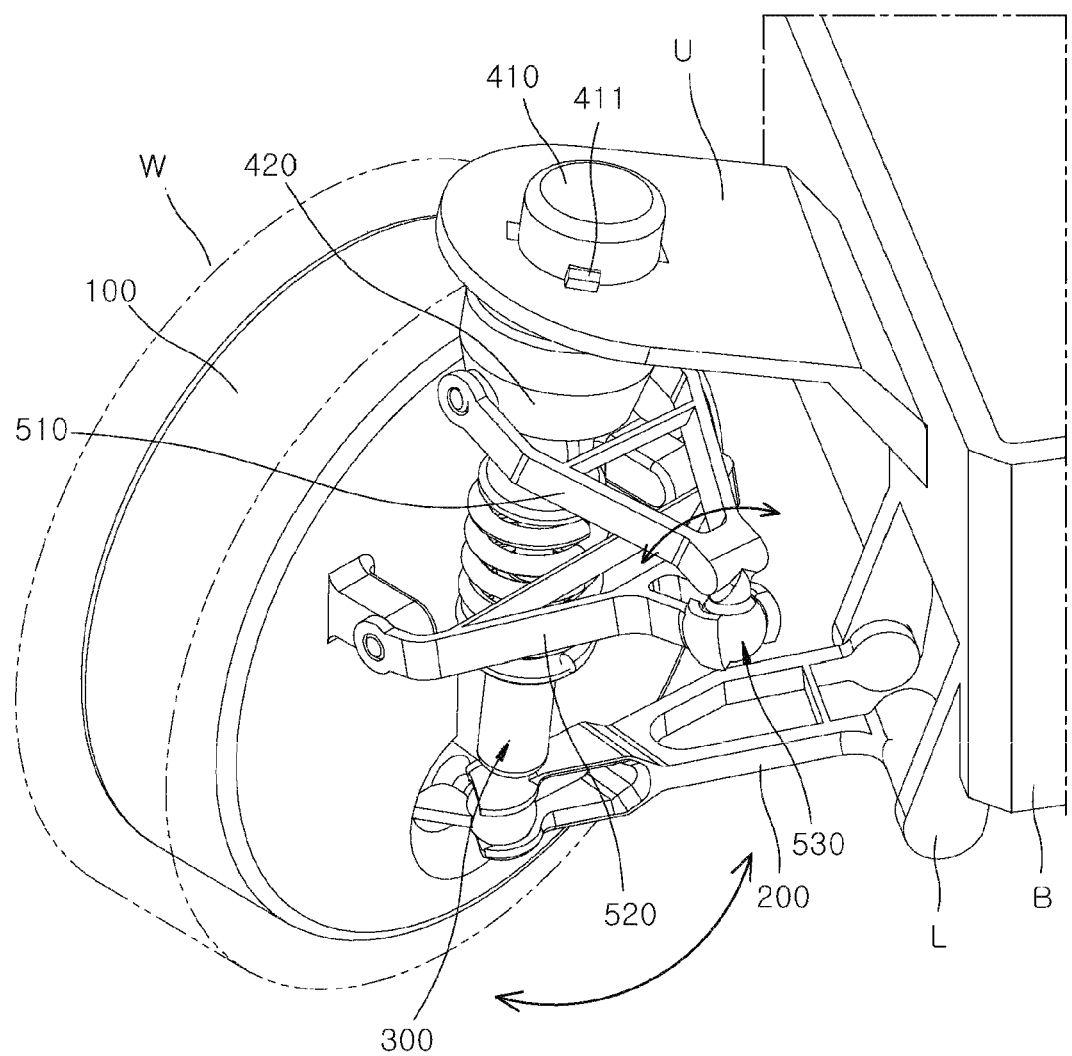
FIG. 9 is a view schematically illustrating a steering operation of the corner module apparatus according to the first embodiment of the present disclosure.

FIG. 9 is a view schematically illustrating a steering operation of the corner module apparatus according to the first embodiment of the present disclosure.

Referring to FIG. 9, when the vehicle turns, the steering actuator 410 generates a rotational force, and the rotating body 420 is rotated clockwise or counterclockwise about the steering axis 401 by the rotational force generated from the steering actuator 410.

As one end of the first transmission link 510 is connected to the rotating body 420, the first transmission link 510 is rotated about the steering axis 401 together with the rotating body 420.

As the kinetic friction force between the transmission socket 531 and the transmission ball joint 532 is set greater than the magnitude of the rotational force transmitted from the rotating body 420 to the first transmission link 510, the transmission socket 531 and the transmission ball joint 532 do not rotate relative to each other, and the second transmission link 520 rotates together with the first transmission link 510.

As the second transmission link 520 rotates, the drive unit 100 connected, at one surface thereof, to one end of the second transmission link 520 rotates together with the second transmission link 520 and varies the steering angle of the wheel W.

On the other hand, in the process of steering the wheel W, when the sum of the torsional force acting between the transmission socket 531 and the transmission ball joint 532 and the rotational force transmitted from the rotating body 420 to the first transmission link 510 exceeds the static friction force between the transmission socket 531 and the transmission ball joint 532, the transmission socket 531 and the transmission ball joint 532 rotate relative to each other at a certain angle, and can offset the torsional force acting between the transmission socket 531 and the transmission ball joint 532.

Hereinafter, a corner module apparatus 2 according to a second embodiment of the present disclosure will be described.

Figure 10:
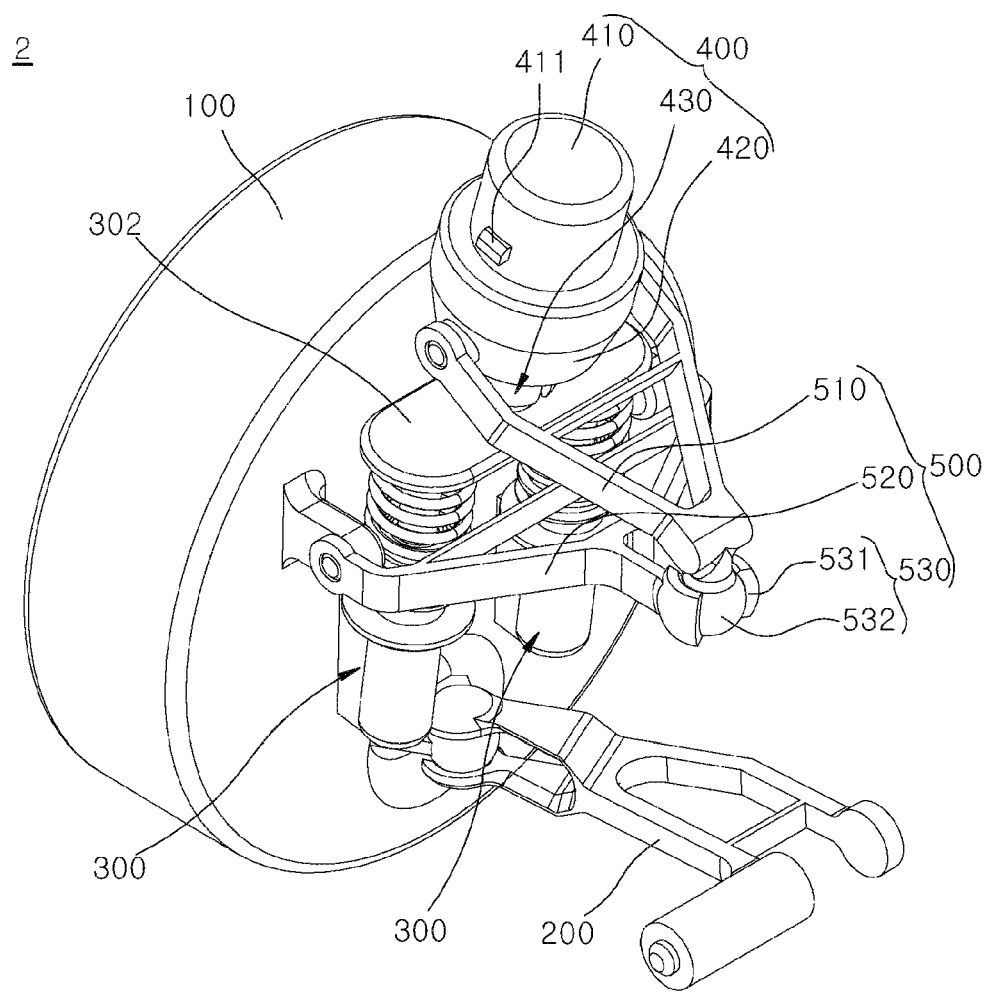
FIG. 10 is a perspective view schematically illustrating a configuration of a corner module apparatus according to a second embodiment of the present disclosure.
Figure 11:
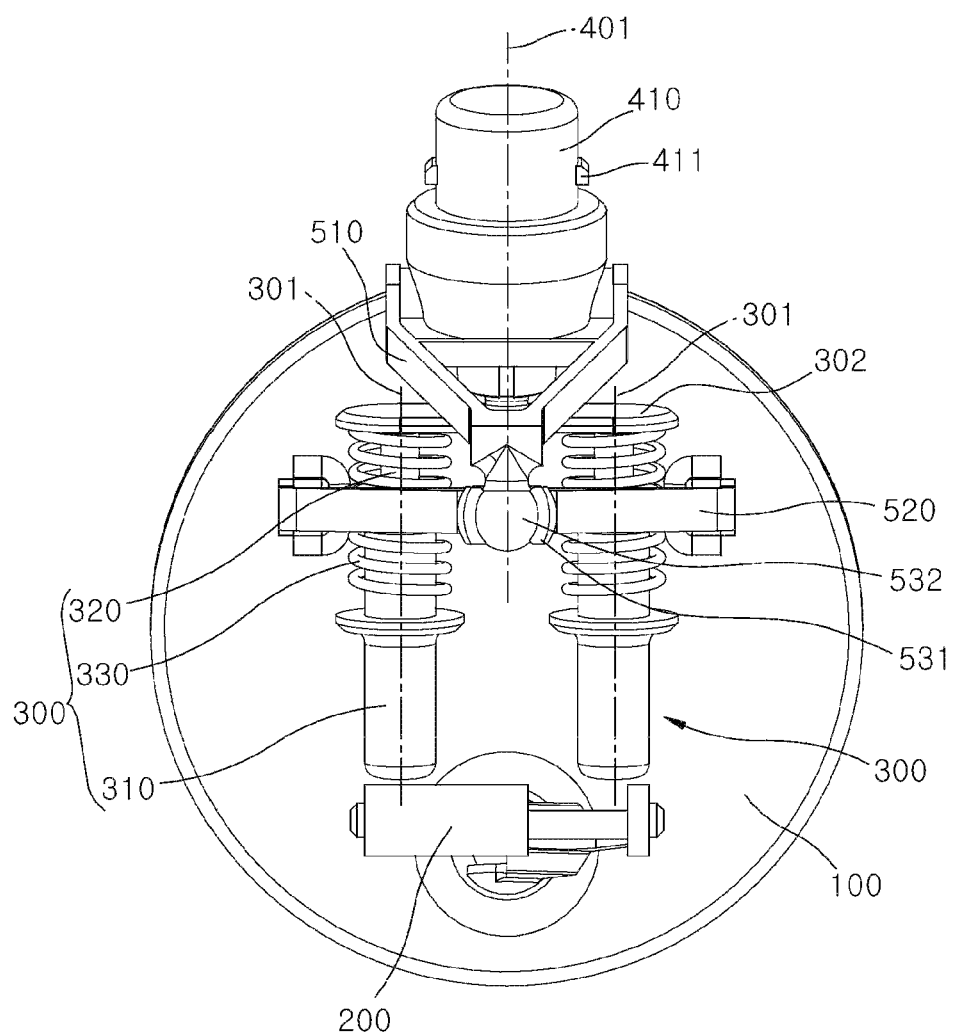
FIG. 11 is a front view schematically illustrating the configuration of the corner module apparatus according to the second embodiment of the present disclosure.

FIG. 10 is a perspective view schematically illustrating a configuration of the corner module apparatus according to the second embodiment of the present disclosure. FIG. 11 is a front view schematically illustrating the configuration of the corner module apparatus according to the second embodiment of the present disclosure.

Referring to FIGS. 10 to 11, the corner module apparatus 2 according to this embodiment may include a drive unit 100, a suspension arm 200, a shock absorber 300, a steering drive member 400, and a steering transmission member 500.

The corner module apparatus 2 according to this embodiment may have the same configuration as the corner module apparatus 1 according to the first embodiment of the present disclosure, with the sole exception of a detailed configuration of the shock absorber 300. Therefore, in the corner module apparatus 2 according to this embodiment, only the detailed configuration of the shock absorber 300 different from that of the corner module apparatus 1 according to the first embodiment of the present disclosure will be described. The description of the corner module apparatus 1 according to the first embodiment of the present disclosure may be applied as it is to the remaining configurations of the corner module apparatus 2 according to this embodiment.

The shock absorber 300 according to this embodiment may consist of a pair of shock absorbers. The pair of shock absorbers 300 may be disposed parallel to each other. The central axes 301 of the pair of shock absorbers 300 may be spaced apart from each other with the steering axis 401 interposed therebetween. That is, unlike the first embodiment, the central axes 301 of the pair of shock absorbers 300 may be disposed so as not to intersect the steering axis 401 at any one point. Accordingly, the corner module apparatus 2 according to this embodiment can distribute to the pair of shock absorbers 300 the shock generated during the bump and rebound movements of the wheel W, and can reduce the height of the shock absorbers 300 in relation to the same load, thereby making it easy to implement a low-floor vehicle. In addition, the corner module apparatus 2 according to this embodiment may easily utilize the shock absorbers 300 having various lengths as the central axes 301 of the shock absorbers 300 are spaced apart from the steering axis 401.

The upper ends of the piston rods 320 provided in the pair of shock absorbers 300 may be interconnected by a connection bracket 302. In this case, the steering ball joint 432 may be connected to the upper surface of the connection bracket 302.

Hereinafter, a corner module apparatus 3 according to a third embodiment of the present disclosure will be described.

Figure 12:
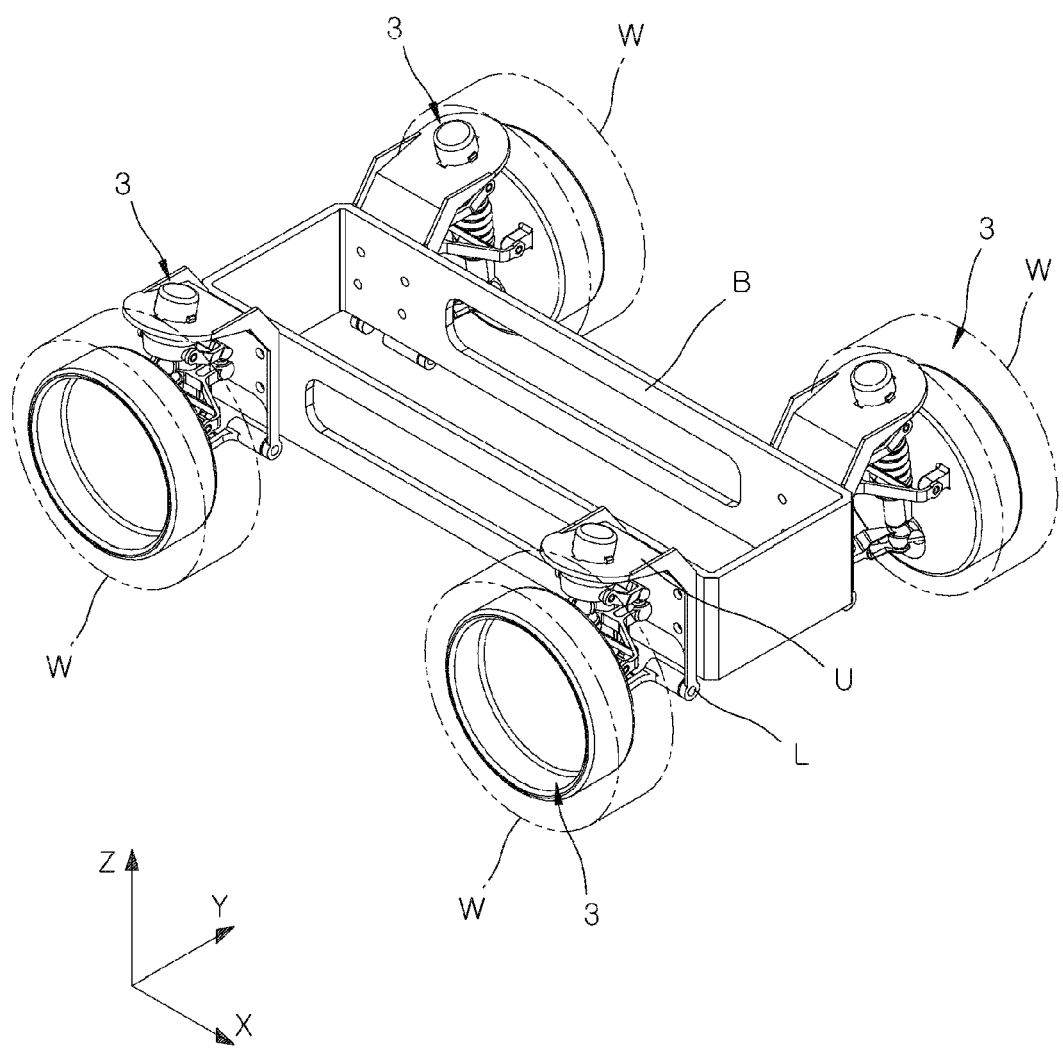
FIG. 12 is a perspective view schematically illustrating an installation state of a corner module apparatus according to a third embodiment of the present disclosure.
Figure 13:
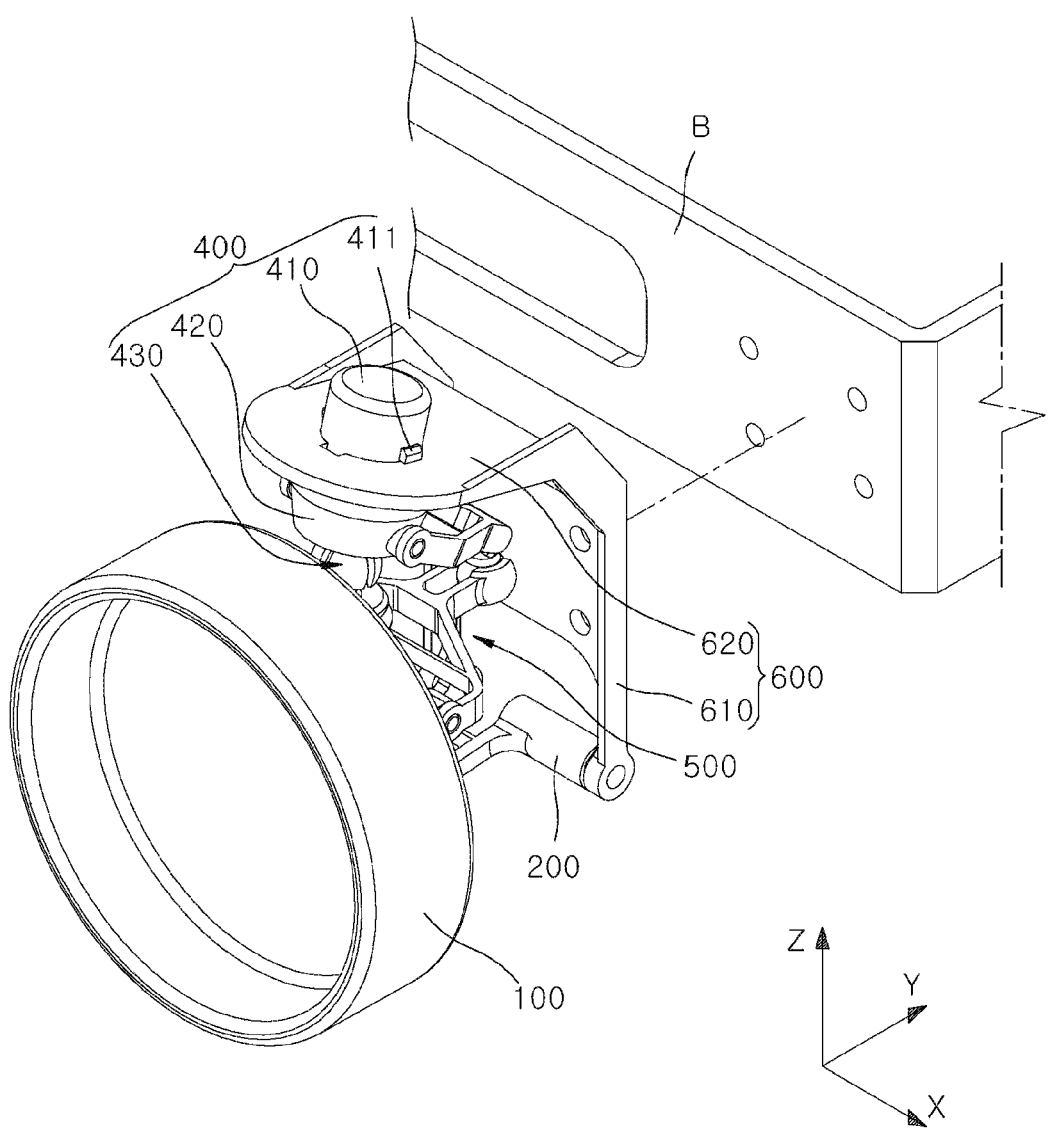
FIG. 13 is a view schematically illustrating an assembly process of the corner module apparatus according to the third embodiment of the present disclosure.
Figure 14:
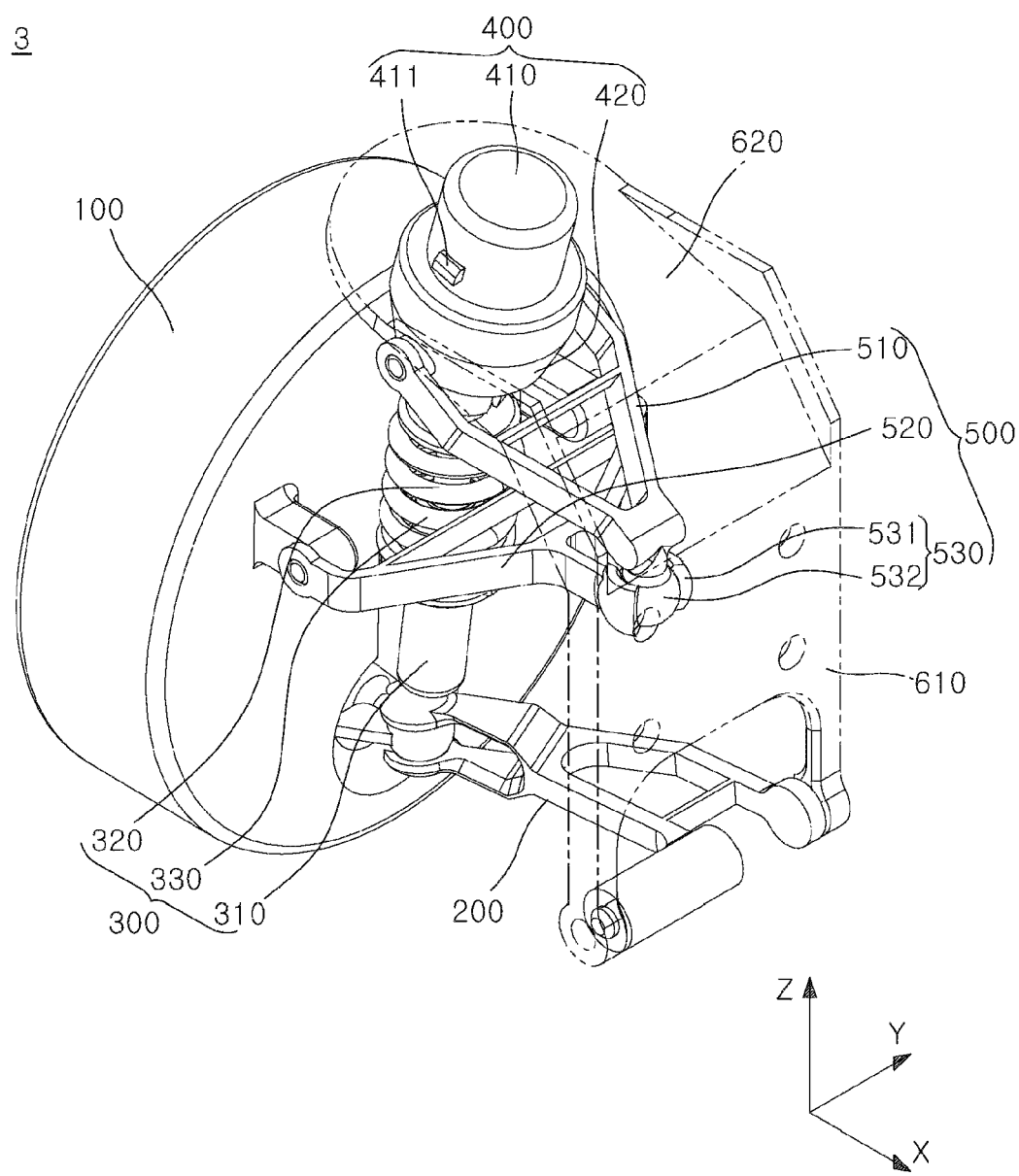
FIG. 14 is a perspective view schematically illustrating a configuration of the corner module apparatus according to the third embodiment of the present disclosure.
Figure 15:
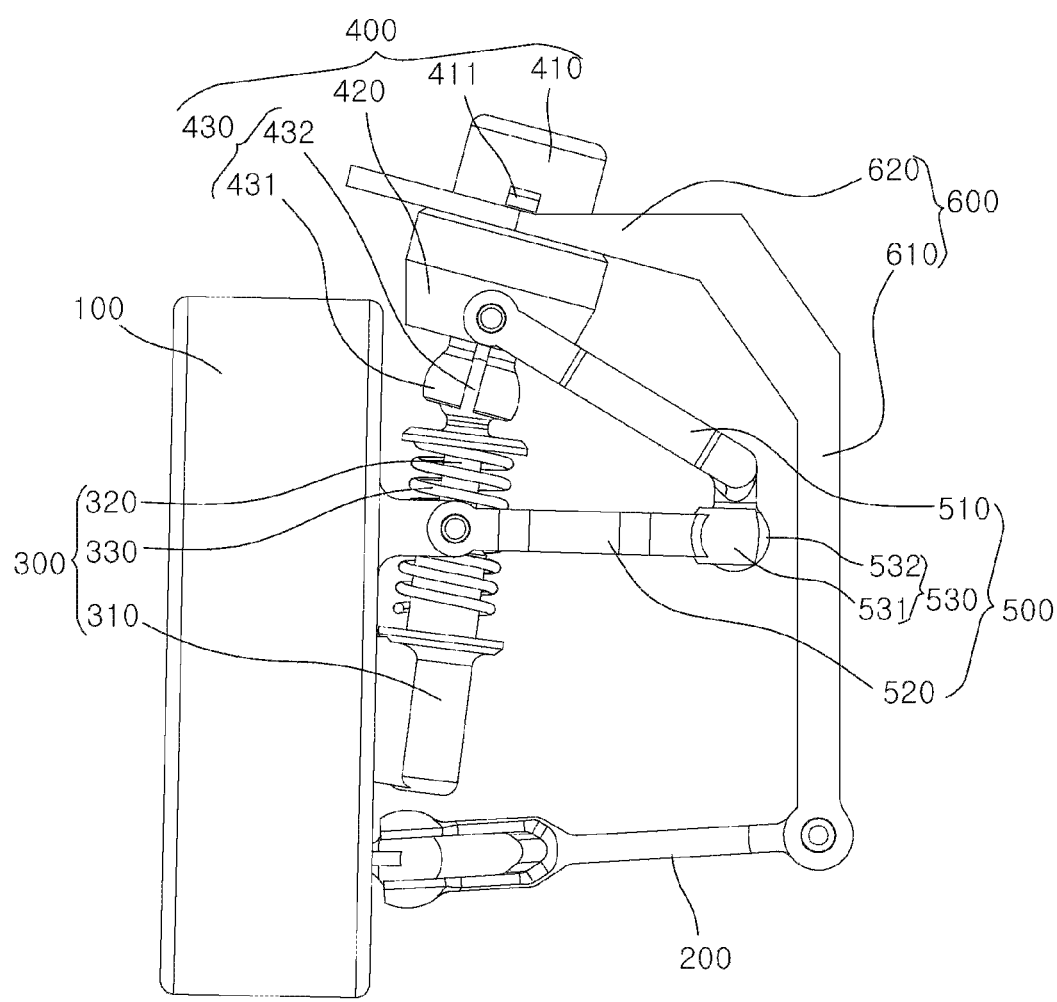
FIG. 15 is a side view schematically illustrating the configuration of the corner module apparatus according to the third embodiment of the present disclosure.

FIG. 12 is a perspective view schematically illustrating an installation state of the corner module apparatus according to the third embodiment of the present disclosure. FIG. 13 is a view schematically illustrating an assembly process of the corner module apparatus according to the third embodiment of the present disclosure. FIG. 14 is a perspective view schematically illustrating a configuration of the corner module apparatus according to the third embodiment of the present disclosure. FIG. 15 is a side view schematically illustrating the configuration of the corner module apparatus according to the third embodiment of the present disclosure.

Referring to FIGS. 12 to 15, the corner module apparatus 3 according to this embodiment may include a drive unit 100, a suspension arm 200, a shock absorber 300, a steering drive member 400, a steering transmission member 500, and a module body 600.

The corner module apparatus 3 according to this embodiment may have the same configuration as the corner module apparatus 1 according to the first embodiment of the present disclosure, with the sole exception of the module body 600. Therefore, in the corner module apparatus 3 according to this embodiment, only the module body 600 different from the components of the corner module apparatus 1 according to the first embodiment of the present disclosure will be described. The description of the corner module apparatus 1 according to the first embodiment of the present disclosure may be applied as it is to the remaining configurations of the corner module apparatus 3 according to this embodiment.

The vehicle body B according to this embodiment may have no upper bracket U and no lower bracket L. Accordingly, the other end of the suspension arm 200 and the steering actuator 410 according to this embodiment may be separated from the vehicle body B.

The module body 600 is detachably coupled to the vehicle body B, and supports the suspension arm 200 and the steering drive member 400 with respect to the vehicle body B. That is, the module body 600 may function as a component that integrates the drive unit 100, the suspension arm 200, the shock absorber 300, the steering drive member 400, and the steering transmission member 500 into a single unit module. Accordingly, the module body 600 can further simplify the shape of the vehicle body B and can simplify the assembly process of the corner module apparatus 3 to the vehicle body B.

Figure 16:
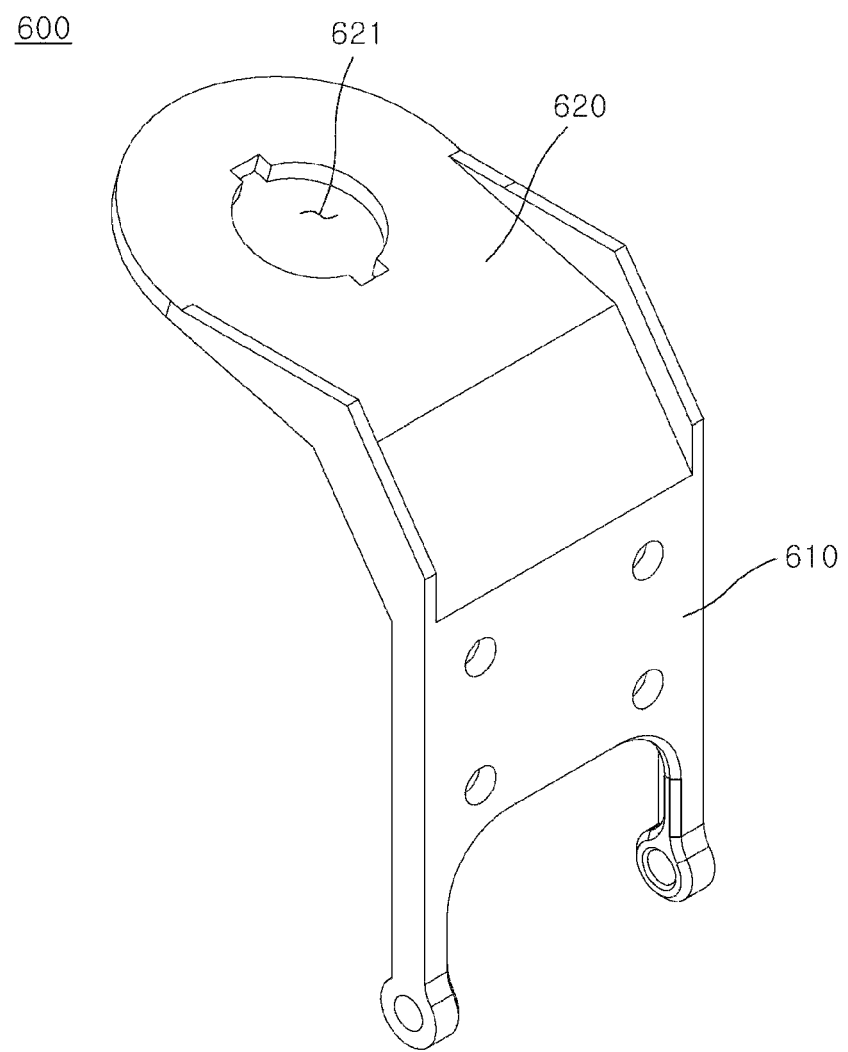
FIG. 16 is a perspective view schematically illustrating a configuration of a module body according to the third embodiment of present disclosure.

FIG. 16 is a perspective view schematically illustrating the configuration of the module body according to the third embodiment of present disclosure.

Referring to FIGS. 12 to 16, the module body 600 according to this embodiment may include a first body 610 and a second body 620.

The first body 610 defines an external appearance of the lower side of the module body 600 and is connected to the suspension arm 200. That is, the first body 610 may function as a component that supports the suspension arm 200 with respect to the vehicle body B. The first body 610 according to this embodiment may be in the form of a plate extending in the height direction of the vehicle, namely, in the Z-axis direction in FIG. 12.

The first body 610 may be disposed such that its inner surface faces the drive unit 100 at a predetermined distance therefrom in the width direction of the vehicle, namely, in the Y-axis direction in FIG. 12. The outer surface of the first body 610 may be detachably coupled to the side surface of the vehicle body B. In this case, the first body 610 may be detachably coupled to the side surface of the vehicle body B by various types of coupling methods such as bolting, fitting, and hooking. As the first body 610 is coupled to the side surface of the vehicle body B, it is possible to more easily implement a low-floor vehicle compared to the case where the first body 610 is coupled to the upper or lower end of the vehicle body B.

The lower end of the first body 610 may be connected to the other end of the suspension arm 200. In this case, the first body 610 may rotatably support the other end of the suspension arm 200 via a bush or the like.

The second body 620 defines an external appearance of the upper side of the module body 600 and is connected to the steering drive member 400. That is, the second body 620 may function as a component that supports the steering drive member 400 with respect to the vehicle body B. The second body 620 according to this embodiment may be in the form of a plate extending in the width direction of the vehicle body from the upper end of the first body 610. The second body 620 may have an insertion hole 621 formed therethrough vertically. The upper end of the steering actuator 410 may be inserted into the insertion hole 621, and the hook 411 may be latched to the upper surface of the second body 620.

Hereinafter, a corner module apparatus 4 according to a fourth embodiment of the present disclosure will be described.

Figure 17:
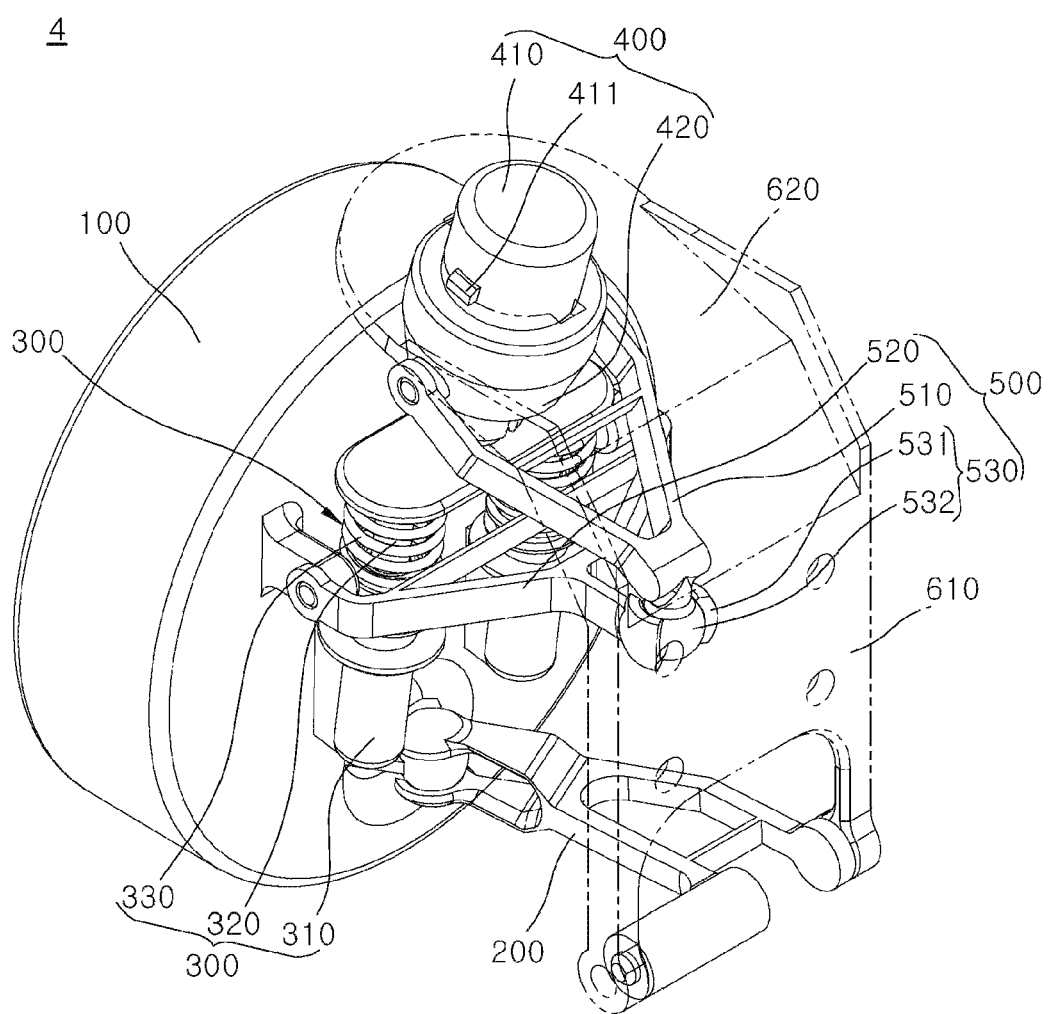
FIG. 17 is a perspective view schematically illustrating a configuration of a corner module apparatus according to a fourth embodiment of the present disclosure.
Figure 18:
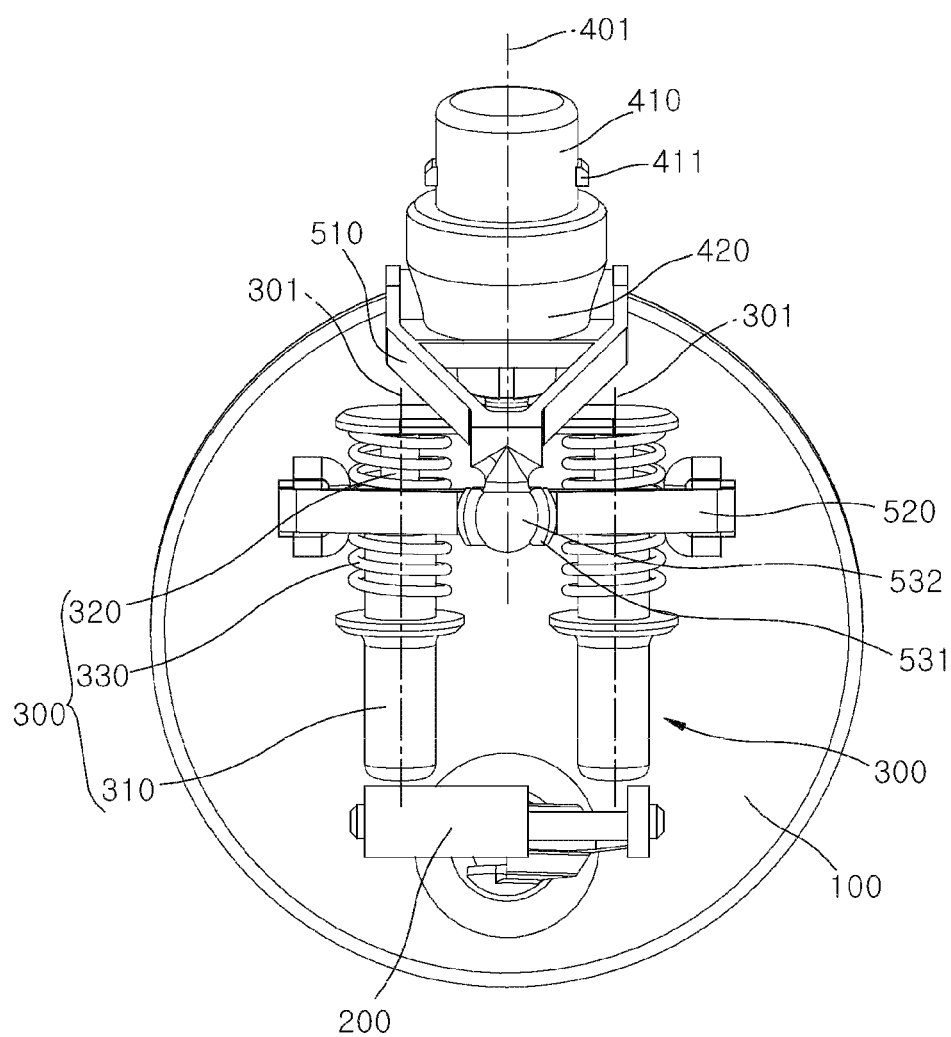
FIG. 18 is a front view schematically illustrating the configuration of the corner module apparatus according to the fourth embodiment of the present disclosure.

FIG. 17 is a perspective view schematically illustrating a configuration of the corner module apparatus according to the fourth embodiment of the present disclosure. FIG. 18 is a front view schematically illustrating the configuration of the corner module apparatus according to the fourth embodiment of the present disclosure.

Referring to FIGS. 17 and 18, the corner module apparatus 4 according to this embodiment may include a drive unit 100, a suspension arm 200, a shock absorber 300, a steering drive member 400, a steering transmission member 500, and a module body 600.

The corner module apparatus 4 according to this embodiment may have the same configuration as the corner module apparatus 3 according to the third embodiment of the present disclosure, with the sole exception of a detailed configuration of the shock absorber 300. Therefore, in the corner module apparatus 4 according to this embodiment, only the detailed configuration of the shock absorber 300 different from that of the corner module apparatus 3 according to the third embodiment of the present disclosure will be described. The description of the corner module apparatus 3 according to the third embodiment of the present disclosure may be applied as it is to the remaining configurations of the corner module apparatus 4 according to this embodiment.

The shock absorber 300 according to this embodiment may consist of a pair of shock absorbers. The pair of shock absorbers 300 may be disposed parallel to each other. The central axes 301 of the pair of shock absorbers 300 may be spaced apart from each other with the steering axis 401 interposed therebetween. That is, unlike the third embodiment, the central axes 301 of the pair of shock absorbers 300 may be disposed so as not to intersect the steering axis 401 at any one point. Accordingly, the corner module apparatus 4 according to this embodiment can distribute to the pair of shock absorbers 300 the shock generated during the bump and rebound movements of the wheel W, and can reduce the height of the shock absorbers 300 in relation to the same load, thereby making it easy to implement a low-floor vehicle. In addition, the corner module apparatus 4 according to this embodiment may easily utilize the shock absorbers 300 having various lengths as the central axes 301 of the shock absorbers 300 are spaced apart from the steering axis 401.

The upper ends of the piston rods 320 provided in the pair of shock absorbers 300 may be interconnected by a connection bracket 302. In this case, the steering ball joint 432 may be connected to the upper surface of the connection bracket 302.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims.

Therefore, the technical protection scope of the present disclosure should be defined by the following claims

What is claimed is:

1. A corner module apparatus comprising:
   a drive unit configured to provide a driving force to a wheel;
   a suspension arm configured to support the drive unit with respect to a vehicle body;
   a shock absorber connected at one side thereof to the drive unit and configured to be stretchable;
   a steering drive member configured to:
      support another side of the shock absorber with respect to the vehicle body; and
      generate a steering force; and
   a steering transmission member provided between the steering drive member and the drive unit, the steering transmission member configured to vary a steering angle of the wheel in conjunction with the steering force generated by the steering drive member,
   wherein the steering member comprises a steering actuator positioned above the shock absorber,
   wherein the steering actuator is fixed to the vehicle body and configured to generate a rotational force, and
   wherein the steering drive member further comprises:
      a rotating body connected to the steering actuator and rotated about a steering axis by receiving the rotational force from the steering actuator; and
      a steering joint provided between the rotating body and the shock absorber, the steering joint configured to rotatably support the rotating body with respect to the shock absorber.

2. The corner module apparatus according to claim 1, further comprising:
   a plurality of hooks protruding from the steering actuator, spaced along a circumferential surface of the steering actuator, and latched to the vehicle body.

3. The corner module apparatus according to claim 1, wherein the steering joint comprises:
   a steering socket connected to one of the shock absorber and the rotating body; and
   a steering ball joint connected to the other of the shock absorber and the rotating body and inserted into the steering socket.

4. The corner module apparatus according to claim 1, wherein the steering transmission member comprises:
   a first transmission link rotatably connected to the rotating body;
   a second transmission link rotatably connected to the drive unit; and
   a transmission joint provided between the first transmission link and the second transmission link, the transmission joint configured to support the first transmission link and the second transmission link to be relatively rotatable.

5. The corner module apparatus according to claim 4,
   wherein the first transmission link is rotatably connected to the rotating body around a first hinge axis intersecting the steering axis; and
   wherein the second transmission link is rotatably connected to the drive unit around a second hinge axis that intersects the steering shaft and spaced apart from the first hinge axis.

6. The corner module apparatus according to claim 4, wherein the transmission joint comprises:
   a transmission socket connected to one of the first transmission link and the second transmission link; and
   a transmission ball joint connected to the other of the first transmission link and the second transmission link, the transmission ball joint positioned in the transmission socket.

7. The corner module apparatus according to claim 1, wherein the shock absorber comprises:
   a cylinder fixed to the drive unit;
   a piston rod slidably installed in the cylinder and connected to the steering drive member; and
   a spring connected at both sides thereof to the respective cylinder and piston rod, and elastically deformable in conjunction with a sliding of the piston rod.

8. The corner module apparatus according to claim 1,
   wherein the shock absorber comprises a pair of shock absorbers, and
   wherein the pair of shock absorbers have respective central axes that are spaced apart from each other, with the steering axis interposed therebetween.

9. The corner module apparatus according to claim 1, wherein the suspension arm is rotatably connected at both ends thereof to the vehicle body and the drive unit.

10. A corner module apparatus comprising:
    a drive unit configured to provide a driving force to a wheel;
    a suspension arm extending from the drive unit;
    a shock absorber connected at one side thereof to the drive unit and configured to be stretchable;
    a steering drive member connected to another side of the shock absorber and configured to generate a steering force;
    a steering transmission member provided between the steering drive member and the drive unit, the steering transmission member configured to vary a steering angle of the wheel in conjunction with the steering force generated by the steering drive member; and
    a module body detachably coupled to a vehicle body and configured to support the suspension arm and the steering drive member with respect to the vehicle body,
    wherein the steering member comprises a steering actuator positioned above the shock absorber, wherein the module body comprises:
  a first body detachably coupled to a side surface of the vehicle body and connected to the suspension arm; and
  a second body extending from the first body and connected to the steering drive member, and
wherein the suspension arm is rotatably connected at both ends thereof to the first body and the drive unit.

11. A corner module apparatus comprising:
a drive unit configured to provide a driving force to a wheel;
a suspension arm extending from the drive unit;
a shock absorber connected at one side thereof to the drive unit and configured to be stretchable;
a steering drive member connected to another side of the shock absorber and configured to generate a steering force;
a steering transmission member provided between the steering drive member and the drive unit, the steering transmission member configured to vary a steering angle of the wheel in conjunction with the steering force generated by the steering drive member; and
a module body detachably coupled to a vehicle body and configured to support the suspension arm and the steering drive member with respect to the vehicle body,
wherein the steering member comprises a steering actuator positioned above the shock absorber,
wherein the module body comprises:
  a first body detachably coupled to a side surface of the vehicle body and connected to the suspension arm; and
  a second body extending from the first body and connected to the steering drive member,
wherein the steering actuator is coupled to the second body and configured to generate a rotational force, and
wherein the steering member further comprises:
  a rotating body connected to the steering actuator and rotatable about a steering axis by receiving the rotational force from the steering actuator; and
  a steering joint provided between the rotating body and the shock absorber, the steering joint configured to rotatably support the rotating body with respect to the shock absorber.

12. The corner module apparatus according to claim 11, wherein the steering joint comprises:
  a steering socket connected to one of the shock absorber and the rotating body; and
  a steering ball joint connected to the other of the shock absorber and the rotating body, the steering ball being inserted into the steering socket.

13. The corner module apparatus according to claim 11, wherein the steering transmission member comprises:
  a first transmission link rotatably connected to the rotating body;
  a second transmission link rotatably connected to the drive unit; and
  a transmission joint provided between the first transmission link and the second transmission link, the transmission joint configured to rotatably support the first transmission link and the second transmission link such that the transmission links are relatively rotatable.

14. The corner module apparatus according to claim 13, wherein the first transmission link is rotatably connected to the rotating body around a first hinge axis intersecting the steering axis; and
wherein the second transmission link is rotatably connected to the drive unit around a second hinge axis that intersects the steering shaft and spaced apart from the first hinge axis.

15. The corner module apparatus according to claim 13, wherein the transmission joint comprises:
  a transmission socket connected to one of the first transmission link and the second transmission link; and
  a transmission ball joint connected to the other of the first transmission link and the second transmission link and inserted into the transmission socket.

16. The corner module apparatus according to claim 11, wherein the shock absorber comprises:
  a cylinder fixed to the drive unit;
  a piston rod slidably installed in the cylinder and connected to the steering drive member; and
  a spring connected at both sides thereof to the respective cylinder and piston rod, and elastically deformable in conjunction with a sliding of the piston rod.

17. The corner module apparatus according to claim 11, wherein the shock absorber comprises a pair of shock absorbers, and
wherein the pair of shock absorbers have respective central axes spaced that are apart from each other, with the steering axis interposed therebetween.

* * * * *